(12) United States Patent
Mellet et al.

(10) Patent No.: US 11,384,833 B2
(45) Date of Patent: Jul. 12, 2022

(54) TRANSMISSION INTEGRATED CONVERTER FLOW

(71) Applicant: GM Global Technology Operations LLC, Detroit, MI (US)

(72) Inventors: Edward W. Mellet, Rochester Hills, MI (US); Leonid Basin, Farmington Hills, MI (US); Clinton E. Carey, Highland, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 148 days.

(21) Appl. No.: 17/037,930

(22) Filed: Sep. 30, 2020

(65) Prior Publication Data

US 2022/0099179 A1 Mar. 31, 2022

(51) Int. Cl.
*F16H 61/02* (2006.01)
*F16H 61/14* (2006.01)

(52) U.S. Cl.
CPC ..... *F16H 61/0276* (2013.01); *F16H 61/0267* (2013.01); *F16H 61/14* (2013.01); *F16H 2061/0279* (2013.01)

(58) Field of Classification Search
CPC .. F16H 61/0276; F16H 61/0267; F16H 61/14; F16H 2061/0279; F16H 2045/021; F16D 13/74
See application file for complete search history.

(56) References Cited

U.S. PATENT DOCUMENTS

| | | | | |
|---|---|---|---|---|
| 5,762,172 A | * | 6/1998 | Tsukamoto | F16H 45/02 192/3.29 |
| 2009/0241531 A1 | * | 10/2009 | Noda | F16H 61/143 60/470 |
| 2020/0217404 A1 | * | 7/2020 | Mellet | F16H 45/02 |

FOREIGN PATENT DOCUMENTS

DE 102015201454 A1 * 7/2016

* cited by examiner

*Primary Examiner* — Richard W Ridley
*Assistant Examiner* — Aimee Tran Nguyen
(74) *Attorney, Agent, or Firm* — Vivacqua Crane, PLLC (57) ABSTRACT

An automatic transmission comprising a control valve body adapted to control oil flow within the transmission, a torque converter having a torque converter clutch operable in one of an open and an applied condition, a first control circuit between the control valve body and the torque converter and a second control circuit between the control valve body and the torque converter, a first oil path that provides a fluid connection between the first control circuit and the torque converter, a second oil path that provides a fluid connection between the second control circuit and the torque converter, a third oil path that provides a fluid connection between the second control circuit and the torque converter clutch, and an orifice that provides a fluid connection between the second control circuit and the torque converter.

18 Claims, 5 Drawing Sheets

FIG. 6B

TRANSMISSION INTEGRATED CONVERTER FLOW

INTRODUCTION

The present disclosure relates to a torque converter for an automatic transmission.

A typical automatic transmission includes a torque converter to provide a fluid connection between the engine of an automobile and the transmission. A torque converter clutch locks the torque converter, creating a more efficient solid connection. To maintain the fluid connection when the torque converter clutch is open, a high flow of oil through the torque converter is necessary. When the torque converter clutch is applied, there is a solid connection that is not dependent on fluid flow within the torque converter. Thus, current torque converters have torque converter clutches that are designed to provide a higher flow of oil through the torque converter when the torque converter clutch is open.

There are clutch pack designs and apply piston designs that do not provide the benefit of providing a higher flow of oil through the torque converter when the torque converter clutch is open, but do offer other advantages. Thus, while current torque converters achieve their intended purpose, there is a need for a new and improved torque converter that provides higher oil flow through the torque converter when the torque converter clutch is open.

SUMMARY

According to several aspects of the present disclosure, an automatic transmission includes a control valve body adapted to control oil flow within the transmission, a torque converter having a torque converter clutch operable in one of an open and an applied condition, a first control circuit between the control valve body and the torque converter and a second control circuit between the control valve body and the torque converter, a first oil path that provides a fluid connection between the first control circuit and the torque converter, a second oil path that provides a fluid connection between the second control circuit and the torque converter, a third oil path that provides a fluid connection between the second control circuit and the torque converter clutch, and an orifice that provides a fluid connection between the second control circuit and the torque converter.

According to another aspect, the control valve body is adapted to direct oil flow from the control valve body into the torque converter through the first control circuit and the first oil path, and out from the torque converter through the second oil path to the second control circuit and back to the control valve body when the torque converter clutch is open, and to direct oil flow from the control valve body into the torque converter clutch through the second control circuit and the third oil path, direct oil flow from the control valve body into the torque converter through the orifice, and direct oil flow out of the torque converter back to the control valve body through the first oil path and the first control circuit, when the torque converter clutch is applied.

According to another aspect, the orifice is adapted to allow a measured flow of oil to pass therethrough, such that the flow of oil through the torque converter when the torque converter clutch is open is greater than the flow of oil through the torque converter when the torque converter clutch is applied.

According to another aspect, the torque converter clutch includes a torque converter clutch piston, the torque converter clutch piston partially defining an piston apply chamber, the third oil path in fluid communication with the piston apply chamber such that when oil flows to the torque converter clutch from the second control circuit through the third oil path, oil fills the piston apply chamber and actuates the torque converter clutch piston to apply the torque converter clutch.

According to another aspect, the second oil path includes a one-way valve positioned between the second control circuit and the torque converter to prevent oil flow from the second control circuit into the torque converter through the second oil path, and to allow oil flow from the torque converter back to the second control circuit through the second oil path.

According to another aspect, the orifice is formed within the torque converter clutch piston, providing a fluid connection between the second control circuit and the torque converter through the orifice and the third oil path.

According to another aspect, the one-way valve is a ball check valve.

According to another aspect, the orifice is formed within the one-way valve, providing a fluid connection between the second control circuit and the torque converter through the orifice and the second oil path.

According to another aspect, the one-way valve is located externally to the torque converter.

According to several aspect of the present disclosure, a torque converter for an automatic transmission includes a torque converter clutch operable in one of an open and an applied condition, a first oil path that provides a fluid connection between the torque converter and a hydraulic control system for the automatic transmission, a second oil path that provides a fluid connection between the torque converter and the hydraulic control system, a third oil path that provides a fluid connection between the torque converter clutch and the hydraulic control system, and an orifice that provides a fluid connection between the torque converter and the hydraulic control system.

According to another aspect, oil flows into the torque converter through the first oil path, and oil flows out from the torque converter through the second oil path and the orifice when the torque converter clutch is open, and oil flows into the torque converter clutch through the third oil path, oil flows into the torque converter through the orifice, and oil flows out of the torque converter through the first oil path when the torque converter clutch is applied.

According to another aspect, the orifice is adapted to allow a measured flow of oil to pass therethrough, such that the flow of oil through the torque converter when the torque converter clutch is open is greater than the flow of oil through the torque converter when the torque converter clutch is applied.

According to another aspect, the torque converter clutch includes a torque converter clutch piston, the torque converter clutch piston partially defining an piston apply chamber, the third oil path in fluid communication with the oil chamber such that when oil flows into the torque converter clutch through the third oil path, oil fills the piston apply chamber and actuates the torque converter clutch piston to apply the torque converter clutch.

According to another aspect, the second oil path includes a one-way valve to prevent oil flow into the torque converter through the second oil path, and to allow oil flow out from the torque converter through the second oil path, the one-way valve located externally to the torque converter.

According to another aspect, the orifice is formed within the torque converter clutch piston, providing a fluid connection between the torque converter and the third oil path through the orifice.

According to another aspect, the orifice is formed within the one-way valve, providing a fluid connection between the second oil path and the torque converter through the orifice.

According to another aspect, the one-way valve is a ball check valve.

According to several aspects of the present disclosure, an automatic transmission includes a valve body adapted to control oil flow within the transmission, a torque converter having a torque converter clutch operable in one of an open and an applied condition and including a torque converter clutch piston, the torque converter clutch piston partially defining a piston apply chamber, a first control circuit between the valve body and the torque converter and a second control circuit between the valve body and the torque converter, a first oil path that provides a fluid connection between the first control circuit and the torque converter, a second oil path that provides a fluid connection between the second control circuit and the torque converter, the second oil path including a one way valve positioned between the second control circuit and the torque converter to prevent oil flow into the torque converter through the second oil path, and to allow oil flow out from the torque converter through the second oil path, a third oil path that provides a fluid connection between the second control circuit and the torque converter clutch, and an orifice that provides a fluid connection between the second control circuit and the torque converter, wherein the valve body directs oil flow from the valve body into the torque converter through the first control circuit and the first oil path, and out from the torque converter through the second oil path and the orifice to the second control circuit and back to the valve body when the torque converter clutch is open, and directs oil flow from the valve body into the piston apply chamber through the second control circuit and the third oil path to fill the piston apply chamber and actuate the torque converter clutch piston and apply the torque converter clutch, directs oil flow from the valve body into the torque converter through the second control circuit and the orifice, and directs oil flow out of the torque converter back to the valve body through the first oil path and the first control circuit, when the torque converter clutch is applied, wherein the flow of oil through the torque converter when the torque converter clutch is open is greater than the flow of oil through the torque converter when the torque converter clutch is applied.

According to another aspect, the orifice is formed within the torque converter clutch piston, providing a fluid connection between the second control circuit and the torque converter through the orifice and the third oil path.

According to another aspect, the one-way valve is a ball check valve, and the orifice is formed within the ball check valve, providing a fluid connection between the second control circuit and the torque converter through the orifice and the second oil path.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
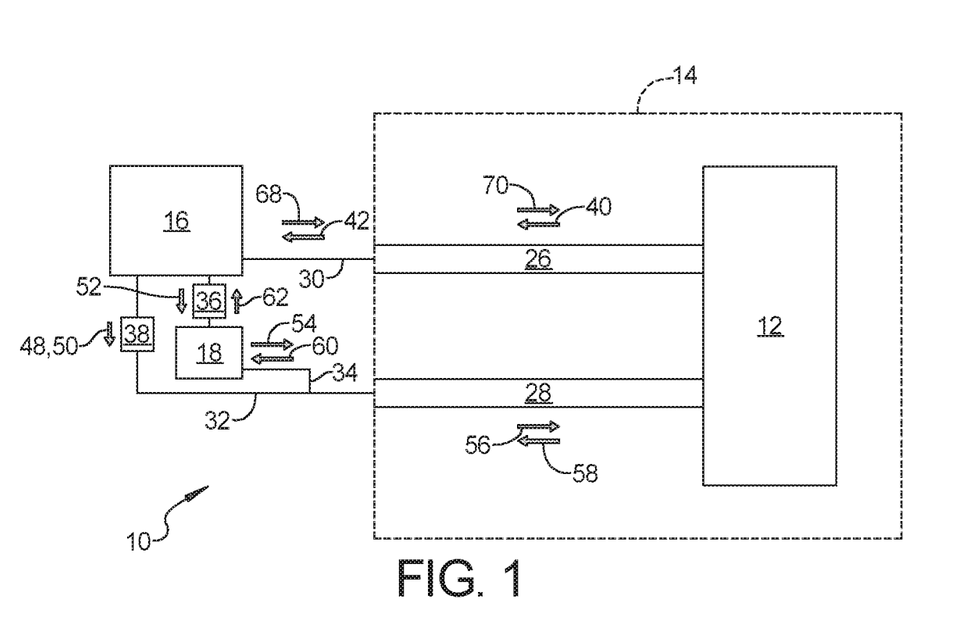
FIG. 1 is a schematic view of an automatic transmission according to an exemplary embodiment.

Referring to FIG. 1, a schematic view of an automatic transmission 10 in accordance with the present disclosure is shown. The automatic transmission 10 includes a control valve body 12 adapted to control oil flow within a hydraulic control system 14 of the transmission 10. The control valve body 12 includes a plurality of passages and valves that control the flow of hydraulic fluid within the transmission 10 and to torque transmitting devices within the transmission 10. Selective actuation of the valves within the control valve body 12 controls actuation and de-activation of the torque transmitting devices.

In the automatic transmission 10 of the present disclosure, one such torque transmitting device is a torque converter 16. The torque converter 16 includes a torque converter clutch 18 operable in one of an open condition and an applied condition. In an exemplary embodiment, the torque converter 16 includes a housing 20. The housing 20 is fixedly attached to a flexplate, also referred to as a flywheel. The flexplate is adapted to connected to an engine output member of an automobile, such as a crankshaft or the like. The flexplate transmits rotational torque from the engine to the torque converter 16.

The torque converter 16 includes a pump that is attached to or integrally formed with the housing 20. The pump rotates with the housing 20 and includes a plurality of vanes disposed within an interior of the housing 20. The vanes are radially spaced about and extend radially outward away from a central axis of the transmission 10. The torque converter 16 further includes a turbine that is concentric with and opposes the pump. The turbine opposes the pump to define a pump cavity between the turbine and the pump.

The turbine is rotatable about the central axis of the transmission. The turbine includes a plurality of vanes disposed within an interior of the housing 20. The vanes of the turbine oppose the vanes of the pump. The vanes of the turbine are radially spaced about and extend radially outward from the central axis. The hydraulic control system 14 circulates a fluid, such as but not limited to a transmission fluid or hydraulic oil, through the torque converter 16. The vanes of the pump force the oil against the vanes of the turbine, which causes the turbine to rotate, thereby creating a fluid connection between the pump and the turbine and transferring torque from the pump to the turbine.

The torque converter clutch 18 selectively interconnects the turbine and the housing 20. The torque converter clutch 18 is actuated by the hydraulic control system 14 between the open condition and the applied condition. When the torque converter clutch 18 is applied, the torque converter clutch 18 couples the turbine to the housing 20 for unitary rotation with the housing 20, thereby eliminating the fluid connection and slip between the turbine and the pump, which increases the efficiency of the torque converter 16. When the torque converter clutch 18 is in the open position, the turbine is de-coupled from the housing 20 to allow independent rotation of the turbine relative to the housing 20, thereby allowing slippage between the turbine and the pump.

The torque converter 16 includes a torque converter clutch piston 22, which is disposed between the housing 20 and the torque converter clutch 18. The torque converter clutch piston 22 and the housing 20 define a piston apply chamber 24 therebetween. An increase in fluid pressure within the piston apply chamber 24 moves the torque converter clutch piston 22 toward the torque converter clutch 18, which increases a compressive force on the torque converter clutch 18, causing the torque converter clutch 18 to apply. A decrease in fluid pressure within the piston apply chamber 24 allows the torque converter clutch piston 22 to move away from the torque converter clutch 18, which decreases the compressive force on the torque converter clutch 18, causing the torque converter clutch 18 to disengage.

A first control circuit 26 extends between the control valve body 12 and the torque converter 16 and a second control circuit 28 extends between the control valve body 12 and the torque converter 16. The control valve body 12 selectively routes oil back and forth within the first and second control circuits 26, 28 to actuate the torque converter clutch 18 between the open and applied positions. In an exemplary embodiment, one or both of the first and second control circuits 26, 28 are formed within a turbine shaft of the automatic transmission 10.

A first oil path 30 provides a fluid connection between the first control circuit 26 and the torque converter 16, a second oil path 32 provides a fluid connection between the second control circuit 28 and the torque converter 16, a third oil path 34 provides a fluid connection between the second control circuit 28 and the torque converter clutch 18, and an orifice 36 provides a fluid connection between the second control circuit 28 and the torque converter 16. The second oil path 32 includes a one-way valve 38 positioned externally to the torque converter 16, between the second control circuit 28 and the torque converter 16 to prevent oil flow from the second control circuit 28 into the torque converter 16 through the second oil path 32, and to allow oil flow from the torque converter 16 back to the second control circuit 28 through the second oil path 32. In an exemplary embodiment, the one-way valve 38 is a ball check valve, however, it should be understood that other types of one-way valves could be utilized.

Figure 2A:
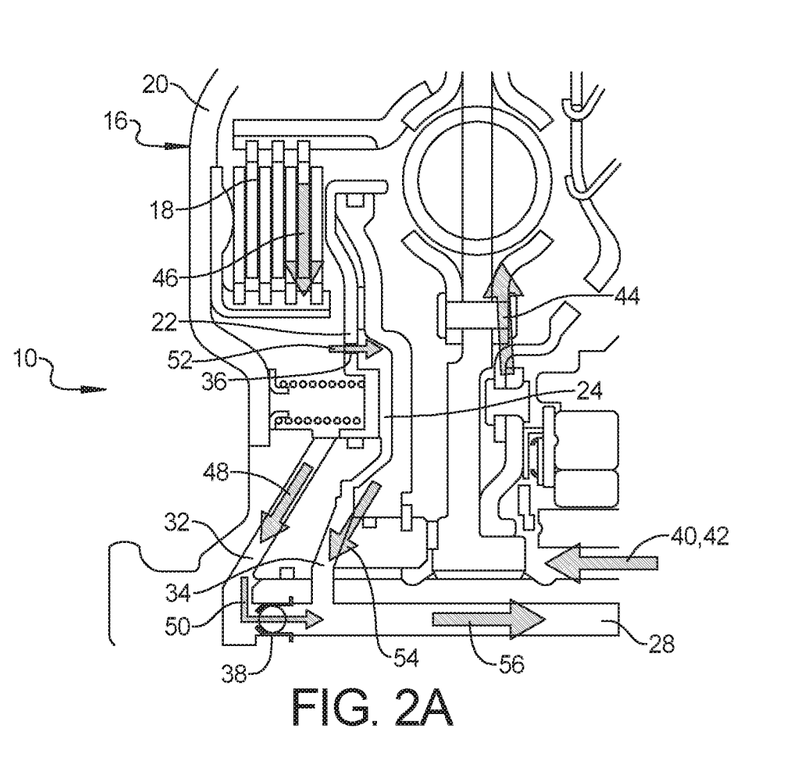
FIG. 2A is a partial cross sectional view of the torque converter of the transmission shown in FIG. 1, illustrating the flow of oil through the torque converter when the torque converter clutch is open.
Figure 2B:
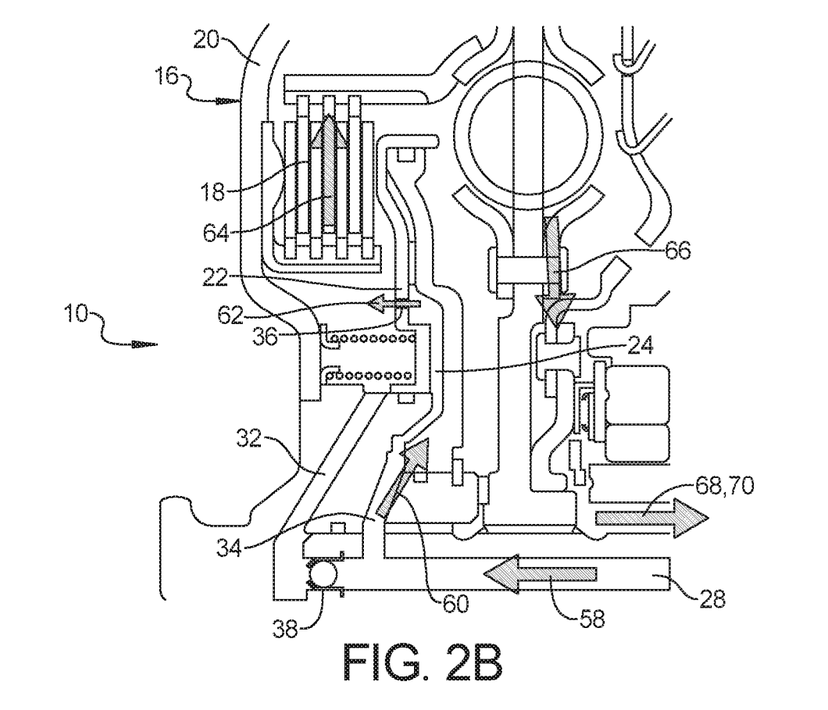
FIG. 2B is a partial cross sectional view of the torque converter of the transmission shown in FIG. 1, illustrating the flow of oil through the torque converter when the torque converter clutch is applied.

Referring to FIG. 1, FIG. 2A and FIG. 2B, in an exemplary embodiment, the orifice 36 is formed within the torque converter clutch piston 22, providing a fluid connection between the second control circuit 28 and the torque converter 16 through the third oil path 34, the piston apply chamber 24 and the orifice 36. Referring to FIG. 1 and FIG. 2A, when the torque converter clutch 18 is open, the control valve body 12 directs oil flow from the control valve body 12 through the first control circuit 26 to the first oil path 30, as indicated by arrow 40, and through the first oil path 30 into the torque converter 16, as indicated by arrow 42. Oil flows through the torque converter, as indicated by arrows 44 and 46. Oil flows out from the torque converter 16 through the second oil path 32, as indicated by arrow 48, and through the one-way valve 38, as indicated by arrow 50, to the second control circuit 28. Oil also flows out from the torque converter 16 through the orifice 36, as indicated by arrow 52, and the third oil path to the second control circuit, as indicated by arrow 54. Oil flows from the second and third oil paths 32, 34 back to the control valve body 12 through the second control circuit 28, as indicated by arrow 56.

Referring to FIG. 1 and FIG. 2B, when the torque converter clutch 18 is applied, the control valve body 12 directs oil flow from the control valve body 12 through the second control circuit 28 to the second and third oil paths 32, 34, as indicated by arrow 58. Oil flows into the piston apply chamber 24 through the third oil path 34, as indicated by arrow 60. Oil flows into the torque converter 16 through the orifice 36, as indicated by arrow 62. Oil flows through the torque converter, as indicated by arrows 64 and 66. Oil flows out from the torque converter 16 through the first oil path 30 to the first control circuit 26, as indicated by arrow 68, and through the first control circuit 26 back to the control valve body 12, as indicated by arrow 70.

Figure 3:
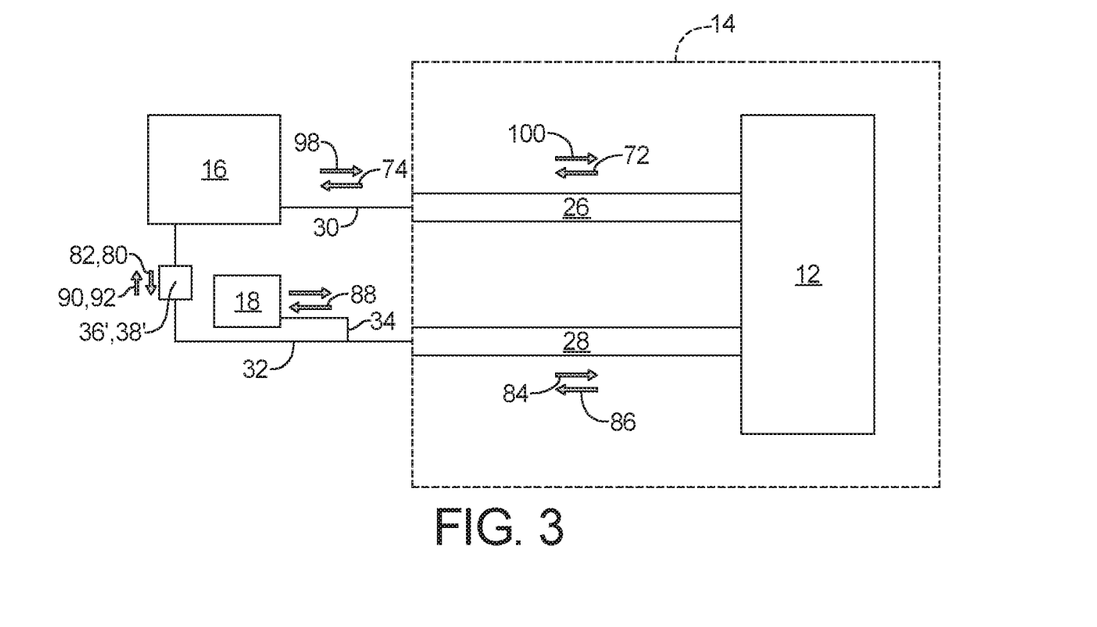
FIG. 3 is a schematic view of an automatic transmission according to another exemplary embodiment.
Figure 4A:
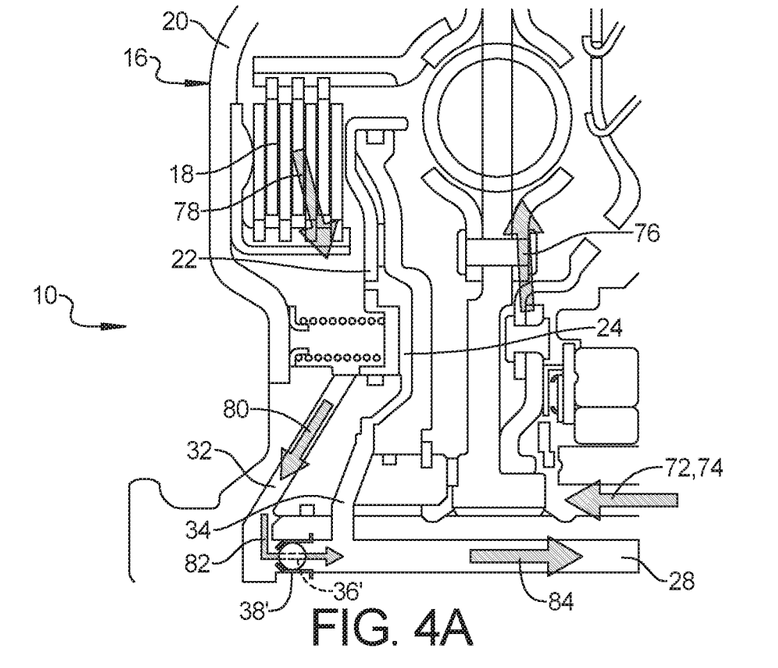
FIG. 4A is a partial cross sectional view of the torque converter of the transmission shown in FIG. 3, illustrating the flow of oil through the torque converter when the torque converter clutch is open.
Figure 4B:
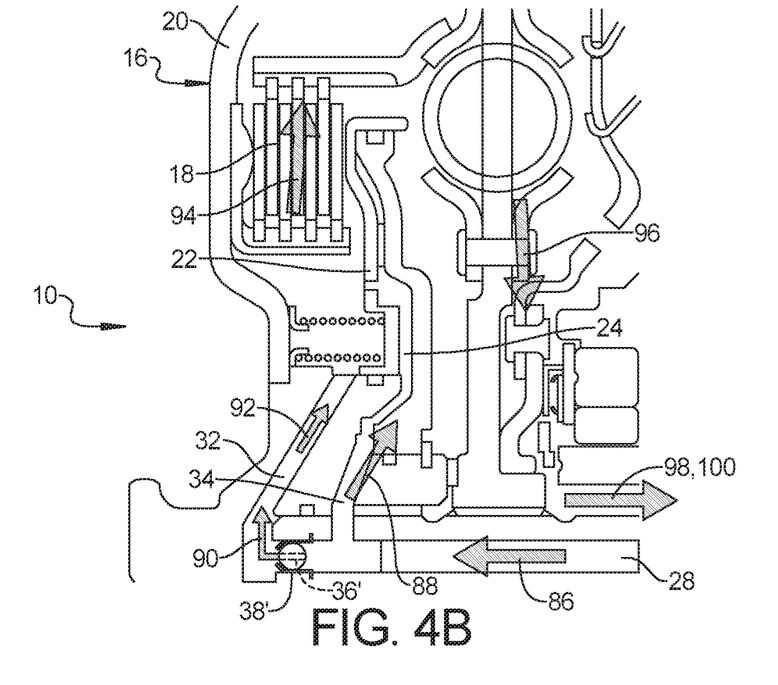
FIG. 4B is a partial cross sectional view of the torque converter of the transmission shown in FIG. 3, illustrating the flow of oil through the torque converter when the torque converter clutch is applied.

Referring to FIG. 3, FIG. 4A and FIG. 4B, in another exemplary embodiment, the orifice 36' is formed within the one-way valve 38', providing a fluid connection between the second oil path 32 and the torque converter 16 through the orifice 36'. Referring to FIG. 3 and FIG. 4A, when the torque converter clutch 18 is open, the control valve body 12 directs oil flow from the control valve body 12 through the first control circuit 26 to the first oil path 30, as indicated by arrow 72, and through the first oil path 30 into the torque converter 16, as indicated by arrow 74. Oil flows through the torque converter 16, as indicated by arrows 76 and 78. Oil flows out from the torque converter 16 through the second oil path 32, as indicated by arrow 80, through the one-way valve 38' and to the second control circuit 28, as indicated by arrow 82. Oil flows through the second control circuit 28 back to the control valve body 12, as indicated by arrow 84.

Referring to FIG. 3 and FIG. 4B, when the torque converter clutch 18 is applied, the control valve body 12 directs oil flow from the control valve body 12 through the second control circuit 28 to the second and third oil paths 32, 34, as indicated by arrow 86. Oil flows into the piston apply chamber 24 through the third oil path 34, as indicated by arrow 88. Oil flows into the second oil path 32 through the orifice 36' in the one-way valve 38', as indicated by arrow 90. Oil flows into the torque converter 16 through the second oil path 32, as indicated by arrow 92. Oil flows through the torque converter 16, as indicated by arrows 94 and 96. Oil flows out from the torque converter 16 through the first oil path 30 to the first control circuit 26, as indicated by arrow 98, and through the first control circuit 26 back to the control valve body 12, as indicated by arrow 100.

The torque converter 16 requires a higher flow of oil when the torque converter clutch 18 is open than when the torque converter clutch 18 is applied. For this reason, the only flow of oil into the torque converter 16, when the torque converter clutch 18 is applied, is through the orifice 36, 36'. The orifice 36, 36' is adapted to allow a measured flow of oil to pass through. When the torque converter clutch 18 is open, oil flows freely through the second oil path 32, un-restricted by the one-way valve 38, 38', providing a relatively high flow of oil through the torque converter 16. When the torque converter clutch 18 is applied, the one-way valve 38, 38' blocks oil from flowing freely into the torque converter 16 through the second oil path 32. The orifice 36, 36' provides a measured or restricted flow of oil entering and passing through the torque converter 16, such that the flow of oil through the torque converter 16 when the torque converter clutch 18 is open, is greater than the flow of oil through the torque converter 16 when the torque converter clutch 18 is applied. While two specific embodiments of the orifice 36, 36' have been described herein, it should be understood that the orifice 36, 36' could be located in other positions within the transmission 10, such as the turbine shaft, to allow a measured flow of oil into the torque converter 16 when the torque converter clutch 18 is applied.

Figure 5:
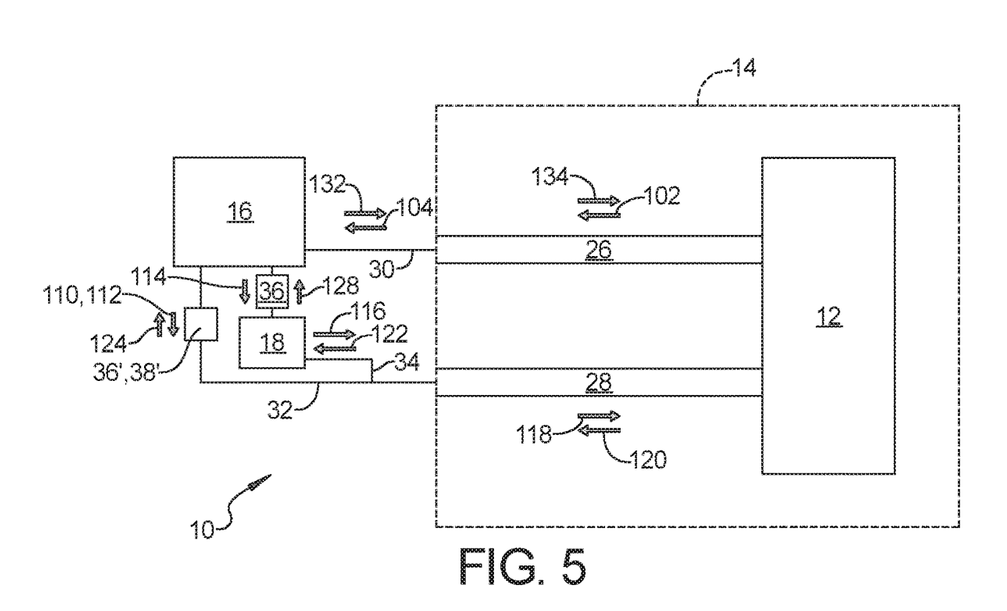
FIG. 5 is a schematic view of an automatic transmission according to another exemplary embodiment.
Figure 6A:
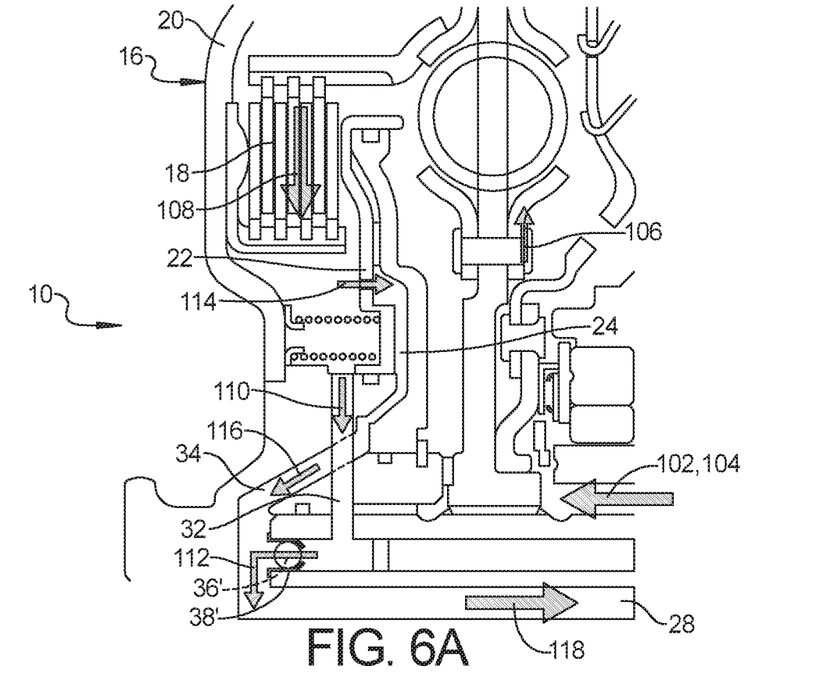
FIG. 6A is a partial cross sectional view of the torque converter of the transmission shown in FIG. 5, illustrating the flow of oil through the torque converter when the torque converter clutch is open.
Figure 6B:
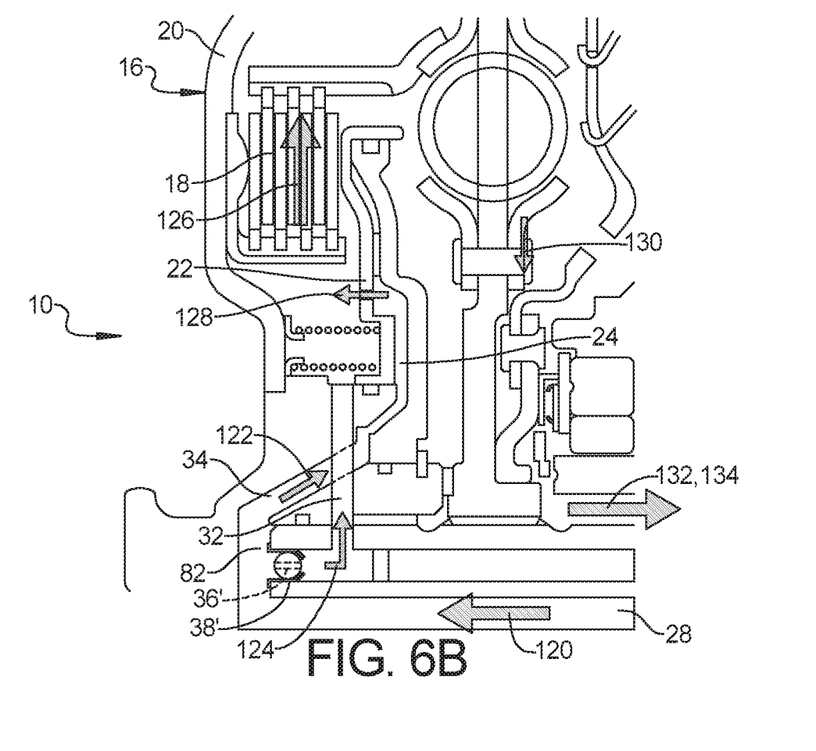
FIG. 6B is a partial cross sectional view of the torque converter of the transmission shown in FIG. 5, illustrating the flow of oil through the torque converter when the torque converter clutch is applied.

Referring to FIG. 5, FIG. 6A and FIG. 6B, in another exemplary embodiment, the orifice 36 formed within the torque converter clutch piston 22 is included and provides a fluid connection between the second control circuit 28 and the torque converter 16 through the third oil path 34, the piston apply chamber 24 and the orifice 36. Additionally, the orifice 36' formed within the one-way valve 38' is included and provides a fluid connection between the second oil path 32 and the torque converter 16 through the orifice 36'.

Referring to FIG. 5 and FIG. 6A, when the torque converter clutch 18 is open, the control valve body 12 directs oil flow from the control valve body 12 through the first control circuit 26 to the first oil path 30, as indicated by arrow 102, and through the first oil path 30 into the torque converter 16, as indicated by arrow 104. Oil flows through the torque converter 16, as indicated by arrows 106 and 108. Oil flows out from the torque converter 16 through the second oil path 32, as indicated by arrow 110, through the one-way valve 38' and to the second control circuit 28, as indicated by arrow 112. Oil also flows through the orifice 36, as indicated by arrow 114, through the third oil path 34, as indicated by arrow 116, to the second control circuit 28. Oil flows through the second control circuit 28 back to the control valve body 12, as indicated by arrow 118.

Referring to FIG. 5 and FIG. 6B, when the torque converter clutch 18 is applied, the control valve body 12 directs oil flow from the control valve body 12 through the second control circuit 28 to the second and third oil paths 32, 34, as indicated by arrow 120. Oil flows into the piston apply chamber 24 through the third oil path 34, as indicated by arrow 122. Oil flows into the second oil path 32 through the orifice 36' in the one-way valve 38', as indicated by arrow 124. Oil flows into the torque converter 16 from the second oil path 32, as indicated by arrow 126. Oil flows into the torque converter 16 from the piston apply chamber 24 through the orifice 36, as indicated by arrow 128. Oil flows through the torque converter 16, as indicated by arrow 130. Oil flows out from the torque converter 16 through the first oil path 30 to the first control circuit 26, as indicated by arrow 132, and through the first control circuit 26 back to the control valve body 12, as indicated by arrow 134.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An automatic transmission comprising:
    a control valve body adapted to control oil flow within the transmission;
    a torque converter having a torque converter clutch operable in one of an open and an applied condition;
    a first control circuit between the control valve body and the torque converter and a second control circuit between the control valve body and the torque converter;
    a first oil path that provides a fluid connection between the first control circuit and the torque converter;
    a second oil path that provides a fluid connection between the second control circuit and the torque converter;
    a third oil path that provides a fluid connection between the second control circuit and the torque converter clutch; and
    an orifice that provides a fluid connection between the second control circuit and the torque converter;
    the control valve body further adapted to:
        direct oil flow from the control valve body into the torque converter through the first control circuit and the first oil path, and out from the torque converter through the second oil path to the second control circuit and back to the control valve body when the torque converter clutch is open; and
        direct oil flow from the control valve body into the torque converter clutch through the second control circuit and the third oil path, direct oil flow from the control valve body into the torque converter through the orifice, and direct oil flow out of the torque converter back to the control valve body through the first oil path and the first control circuit, when the torque converter clutch is applied.

2. The automatic transmission of claim 1, wherein the orifice is adapted to allow a measured flow of oil to pass therethrough, such that the flow of oil through the torque converter when the torque converter clutch is open is greater than the flow of oil through the torque converter when the torque converter clutch is applied.

3. The automatic transmission of claim 2, wherein the torque converter clutch includes a torque converter clutch piston, the torque converter clutch piston partially defining an piston apply chamber, the third oil path in fluid communication with the piston apply chamber such that when oil flows to the torque converter clutch from the second control circuit through the third oil path, oil fills the piston apply chamber and actuates the torque converter clutch piston to apply the torque converter clutch.

4. The automatic transmission of claim 3, wherein the second oil path includes a one-way valve positioned between the second control circuit and the torque converter to prevent oil flow from the second control circuit into the torque converter through the second oil path, and to allow oil flow from the torque converter back to the second control circuit through the second oil path.

5. The automatic transmission of claim 4, wherein the orifice is formed within the torque converter clutch piston, providing a fluid connection between the second control circuit and the torque converter through the orifice and the third oil path.

6. The automatic transmission of claim 4, wherein the one-way valve is a ball check valve.

7. The automatic transmission of claim 6, wherein the orifice is formed within the one-way valve, providing a fluid connection between the second control circuit and the torque converter through the orifice and the second oil path.

8. The automatic transmission of claim 4, wherein the one-way valve is located externally to the torque converter.

9. A torque converter for an automatic transmission comprising:
   a torque converter clutch operable in one of an open and an applied condition;
   a first oil path that provides a fluid connection between the torque converter and a hydraulic control system for the automatic transmission;
   a second oil path that provides a fluid connection between the torque converter and the hydraulic control system;
   a third oil path that provides a fluid connection between the torque converter clutch and the hydraulic control system; and
   an orifice that provides a fluid connection between the torque converter and the hydraulic control system;
   wherein oil flows into the torque converter through the first oil path, and oil flows out from the torque converter through the second oil path and the orifice when the torque converter clutch is open; and
   oil flows into the torque converter clutch through the third oil path, oil flows into the torque converter through the orifice, and oil flows out of the torque converter through the first oil path when the torque converter clutch is applied.

10. The torque converter of claim 9, wherein the orifice is adapted to allow a measured flow of oil to pass therethrough, such that the flow of oil through the torque converter when the torque converter clutch is open is greater than the flow of oil through the torque converter when the torque converter clutch is applied.

11. The torque converter of claim 10, wherein the torque converter clutch includes a torque converter clutch piston, the torque converter clutch piston partially defining an piston apply chamber, the third oil path in fluid communication with the oil chamber such that when oil flows into the torque converter clutch through the third oil path, oil fills the piston apply chamber and actuates the torque converter clutch piston to apply the torque converter clutch.

12. The torque converter of claim 11, wherein the second oil path includes a one-way valve to prevent oil flow into the torque converter through the second oil path, and to allow oil flow out from the torque converter through the second oil path, the one-way valve located externally to the torque converter.

13. The torque converter of claim 12, wherein the orifice is formed within the torque converter clutch piston, providing a fluid connection between the torque converter and the third oil path through the orifice.

14. The torque converter of claim 12, wherein the orifice is formed within the one-way valve, providing a fluid connection between the second oil path and the torque converter through the orifice.

15. The torque converter of claim 12, wherein the one-way valve is a ball check valve.

16. An automatic transmission comprising:
   a valve body adapted to control oil flow within the transmission;
   a torque converter having a torque converter clutch operable in one of an open and an applied condition and including a torque converter clutch piston, the torque converter clutch piston partially defining a piston apply chamber;
   a first control circuit between the valve body and the torque converter and a second control circuit between the valve body and the torque converter;
   a first oil path that provides a fluid connection between the first control circuit and the torque converter;
   a second oil path that provides a fluid connection between the second control circuit and the torque converter, the second oil path including a one way valve positioned between the second control circuit and the torque converter to prevent oil flow into the torque converter through the second oil path, and to allow oil flow out from the torque converter through the second oil path,
   a third oil path that provides a fluid connection between the second control circuit and the torque converter clutch; and
   an orifice that provides a fluid connection between the second control circuit and the torque converter;
   wherein the valve body:
      directs oil flow from the valve body into the torque converter through the first control circuit and the first oil path, and out from the torque converter through the second oil path and the orifice to the second control circuit and back to the valve body when the torque converter clutch is open; and
      directs oil flow from the valve body into the piston apply chamber through the second control circuit and the third oil path to fill the piston apply chamber and actuate the torque converter clutch piston and apply the torque converter clutch, directs oil flow from the valve body into the torque converter through the second control circuit and the orifice, and directs oil flow out of the torque converter back to the valve body through the first oil path and the first control circuit, when the torque converter clutch is applied;
      wherein the flow of oil through the torque converter when the torque converter clutch is open is greater than the flow of oil through the torque converter when the torque converter clutch is applied.

17. The automatic transmission of claim 16, wherein the orifice is formed within the torque converter clutch piston, providing a fluid connection between the second control circuit and the torque converter through the orifice and the third oil path.

18. The automatic transmission of claim 16, wherein the one-way valve is a ball check valve, and the orifice is formed within the ball check valve, providing a fluid connection between the second control circuit and the torque converter through the orifice and the second oil path.

* * * * *